United States Patent
McCarty, Jr. et al.

[15] 3,672,627
[45] June 27, 1972

[54] DIAPHRAGM ASSEMBLY FOR PRESSURE OPERATED PILOT CONTROLLED SHUT-OFF VALVE

[72] Inventors: William R. McCarty, Jr., Skokie; Paul A. Dolter, Roselle; Wesley S. Swanson, Elk Grove, all of Ill.

[73] Assignee: Eaton Yale & Towne Inc., Cleveland, Ohio

[22] Filed: March 2, 1970

[21] Appl. No.: 15,497

Related U.S. Application Data

[63] Continuation-in-part of Ser. No. 850,572, Aug. 15, 1969, Pat. No. 3,593,957.

[52] U.S. Cl. .................................................251/30
[51] Int. Cl. ............................F16k 31/06, F16k 31/145
[58] Field of Search ..........................................251/30, 331

[56] References Cited

UNITED STATES PATENTS

| | | | |
|---|---|---|---|
| 2,629,365 | 2/1953 | Kennedy | 251/30 X |
| 2,888,233 | 5/1959 | Windsor | 251/30 |
| 3,034,761 | 5/1962 | Janquart | 251/331 X |
| 3,253,615 | 5/1966 | Armstrong | 251/30 X |
| 3,312,240 | 4/1967 | Ruchser | 251/30 X |
| 3,433,262 | 3/1969 | Ray | 251/30 X |
| 3,476,146 | 11/1969 | Dolter | 251/30 X |

FOREIGN PATENTS OR APPLICATIONS

| | | | |
|---|---|---|---|
| 1,228,481 | 11/1966 | Germany | 251/30 |

*Primary Examiner*—Samuel Scott
*Attorney*—Hill, Sherman, Meroni, Gross & Simpson

[57] ABSTRACT

A poppet valve for use with a fluid pressure operated pilot controlled diaphragm valve. The poppet valve has a central pilot orifice leading therethrough and bleed holes communicating with mating bleed holes in a diaphragm with a screen means therebetween for allowing fluid passage into the diaphragm pressure chamber and through the central orifice. The poppet valve has a depending stem element fitting within the valve outlet bore arranged to maintain guiding contact with the periphery of the bore throughout the movement thereof and to provide throttling during the closing operation whereby water hammer effect are avoided and the poppet valve is under positive guidance throughout the operation of the diaphragm valve.

7 Claims, 4 Drawing Figures

PATENTED JUN 27 1972　　　　　　　　　　3,672,627

INVENTORS
William R. McCarty, Jr.
Paul A. Dolter
Wesley S. Swanson

BY　Hill, Sherman, Meroni, Gross & Simpson
ATTORNEYS

DIAPHRAGM ASSEMBLY FOR PRESSURE OPERATED PILOT CONTROLLED SHUT-OFF VALVE

This is a continuation-in-part application of our co-pending U.S. Ser. No. 850,572, filed Aug. 15, 1969, now U.S. Pat. No. 3,593,957 which is incorporated herein by reference.

BACKGROUND OF THE INVENTION

The instant invention relates to pilot controlled pressure operated diaphragm valves controlled by a pilot valve and more particularly to an improvement in such valve wherein a poppet valve is utilized in conjunction therewith.

Pilot controlled pressure operated diaphragm valves controlled by a pilot valve, which may be the solenoid of an armature, have frequently been used to control the flow of fluids in appliances, such as in washing machines and like apparatus. Such valves have included a diaphragm having a marginal sealing portion, a thin-walled angular bellows-type portion leading radially inwardly of the sealing portion and a thickened central portion having a central orifice leading therethrough and being selectively closed by the pilot valve. One or more bleed holes having a cross sectional area smaller than the central orifice were provided leading through a portion of the diaphragm. During operation, the diaphragm was subjected to distortion and erosion so that in time, the relation between the cross sectional areas of the orifice and bleed holes were changed to the detriment of valve operation. Plastic inserts for the central portion of the diaphragm having a central orifice and radially spaced bleed holes therethrough have been used in attempts to prevent such problems. However, such constant cross sectional holes are subjected to clogging. The aforesaid co-pending application discloses means of overcoming this disadvantage.

The instant invention provides improvements in this type of construction that not only ensures no clogging of the bleed holes but also provides a means preventing any misalignment of the diaphragm or insert for proper seating on the outlet port during operation of the valve assembly and throttling of fluid flow to reduce or eliminate water hammer effects.

SUMMARY AND OBJECTS OF THE INVENTION

Generally, the invention provides an improved poppet valve insert structure having a stem element in registry with the outlet having a neck portion of an out of line contact in the outlet bore throttling fluid flow during closure and a dependent body portion of a length sufficient to at least maintain contact between said body portion and outlet as the diaphragm moves between the open and closed position so that the stem positively guides the insert structure and attached diaphragm into proper seating with the outlet. The stem structure is provided with a plurality of radially extending ribs from the body portion to accommodate high flow rates therebetween and to provide sliding engagement with the peripheral walls of the outlet and a neck portion to accommodate low flow rates and reduce or eliminate water hammer effects.

Accordingly, it is an important object of the invention to provide an improved diaphragm assembly of the nature described having means ensuring positive guidance of the diaphragm throughout its operation and providing throttling of fluid flow substantially preventing water hammer effects.

It is another object of the invention to provide an improved poppet valve insert structure having a valve head portion for engagement with an outlet port and a depending stem element in registry with said port and comprised of a neck portion and a depending body portion, said neck portion accommodating low fluid flow rates without entrapping dirt particles and the body portion accommodating high fluid flow rates while maintaining contact with said port throughout the movement of said valve.

It is yet another object of the invention to provide an improved poppet valve insert structure having a stem element of varying diameter to throttle fluid flow rates and having means for engaging the peripheral walls of an outlet bore to provide positive guidance of said valve structure throughout its operational movements.

Still another object of the invention is to provide an improved solenoid pilot controlled pressure operated diaphragm shut-off valve including a diaphragm having a poppet valve insert structure having a central pilot orifice and a radially spaced bleed hole leading through said insert, with a screen means affording communication between the bleed hole and a central thickened portion of the diaphragm and having a stem element extending toward and into the outlet port a distance at least equal to the distance between the open and closed position of said shut-off valve and having means allowing throttling of fluid flow past said stem element when the insert is at its open position.

Other objects, features and advantages of the invention will become readily apparent from the following description of the preferred embodiment thereof, taken in conjunction with the accompanying drawings wherein like reference numerals refer to like parts; although it will be appreciated that variations and modifications may be effected without departing from the spirit and scope of the novel concepts of the disclosure.

DESCRIPTION OF A PREFERRED EMBODIMENT OF THE INVENTION

Figure 1:
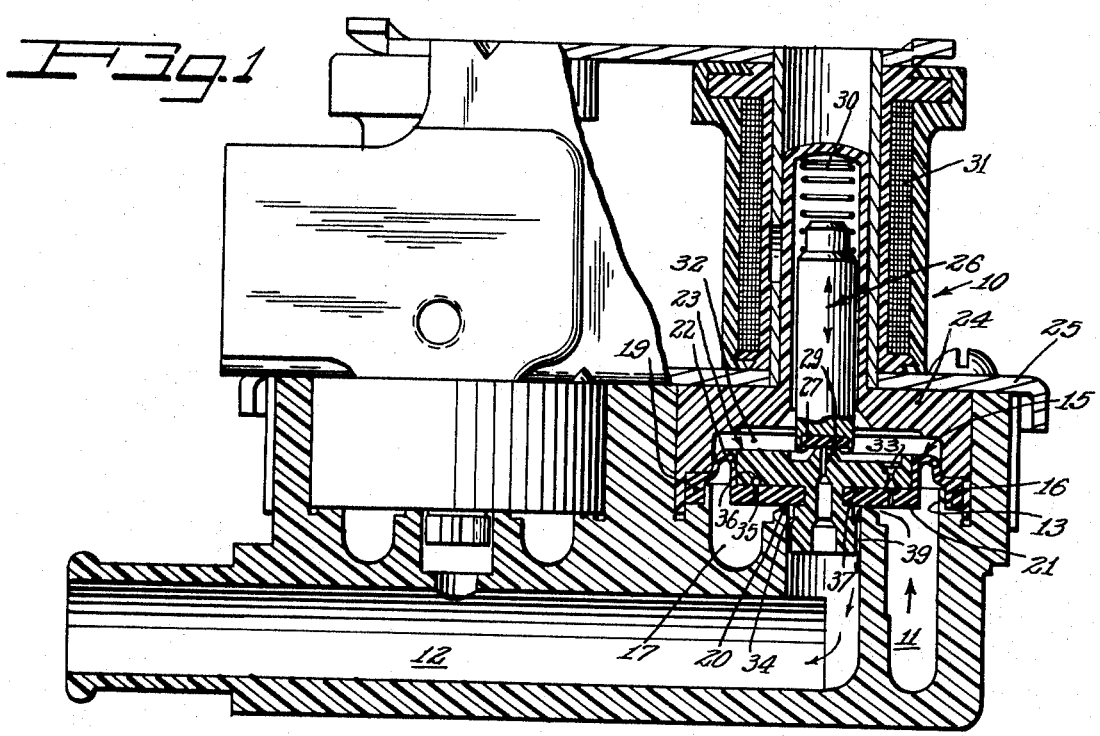
FIG. 1 is a partial fragmentary cross sectional view taken through a pilot controlled pressure operated diaphragm valve assembly constructed in accordance with the principles of the invention.

In FIG. 1 of the drawings, a pressure operated pilot controlled diaphragm mixing valve of a type particularly adapted for use in appliances is shown as comprising a valve body 10 having an inlet 11 leading thereinto and an outlet 12 leading therefrom. The valve shown may be a single shut-off valve. One valve only, therefore, need be shown and described herein. The valve body 10 has at least one cavity 13 therein, containing a diaphragm shut-off valve 15 and having an annular sealing groove 16 extending about an annular inlet passage 17 for receiving a sealing bead 19 of the diaphragm 15.

The diaphragm 15 may be made from rubber or one of the well-known substitutes for rubber and is shown as being seated on an annular outlet port 20 at a central annular disk-like portion 21 of the diaphragm 15. The outer margins of the disk-like portion 21 of the diaphragm 15 terminate into upwardly extending bellows-like convolutions 22 extending along the outer margins of a plastic poppet valve insert structure 23 for cooperation with the central disk-like portion 21 of the diaphragm 15. The convolutions 22 are connected with the sealing bead 19 and form an integral part thereof.

The sealing bead 19 is retained in sealing engagement with the sealing groove 16 by an armature guide 24. The armature guide 24 is retained on the valve body 10 by a retainer plate 25 as shown and described in more detail in co-pending application, Ser. No. 816,714, filed by William R. McCarty, Jr. on Apr. 16, 1969, and additional details may be gathered therefrom. The armature guide 24 forms a guide for an armature 26 having a pilot valve 27 at its lower end cooperating with a pilot orifice 29 leading through the center of the plastic poppet valve insert structure 23 to control opening and closing of the valve. The armature 26 is biased by a spring 30 to engage the pilot valve 27 with the orifice 29 and is movable out of engagement with said orifice by energization of a solenoid coil 31 which encircles the armature 26 in a conventional manner.

The inside of the armature guide 24 is spaced from the diaphragm 15 and poppet valve structure 23. The portion of the armature guide 24, the diaphragm 15 and the poppet structure 23 combined to define a pressure outlet chamber 32 for the buildup of fluid under pressure from the inlet 11 to effect closing of the valve assembly. It will be appreciated that the flow of fluid from the inlet 11 into chamber 32 takes place through bleed orifices 35 and 33 leading through the diaphragm 15 and the poppet valve structure 23, respectively, and that upon closing of the pilot orifice 29 by the pilot valve 27 pressure is built within the pressure chamber 32.

The thickened central portion of diaphragm 15 is provided with a plurality of screened holes or orifices 35 leading therethrough, shown as being on the same circumferential line as the bleed hole 33 of the poppet valve structure 23. The orifices 35 of the diaphragm 15 lead to an annular downwardly opening groove 36 of the poppet valve structure 23 which communicates with the screened hole 35 with the bleed holes 33 to allow inlet fluid to flow through the bleed hole 33 to maintain the valve closed as the pilot valve 27 closes the central orifice 29. It will be noted that the holes 35, 33 are in series and this arrangement aids in governing water hammer affects. The groove 36 is thus sealed to the thickened portion of the diaphragm with a shoulder portion 37 of the poppet valve structure 23. The poppet valve structure 23 is secured to the diaphragm 15 by flexing the diaphragm over and about a depending stem guide portion 39 of the poppet valve structure 23 into the groove formed by the shoulder portions 37 of the poppet valve structure 23.

The guide or stem element 39 is arranged so as to be in registry with the outlet bore 20 for sliding and guiding engagement with the peripheral walls 20a (best seen at FIG. 4) of the bore 20. The stem element 39 is of a length at least equal to the distance that the diaphragm 15 (specifically its central thickened portion 21) moves between the open and closed position whereby the stem element 39 is at all times in guiding contact with the peripheral walls 20a of the outlet bore 20 to maintain positive guidance of the poppet valve structure 23 and attached diaphragm 15 during opening and closing operations. The stem element 39 is also provided with means along its periphery to throttle high and low fluid flow rates past the stem periphery and into the outlet during the open position of the valve assembly.

Figure 2:
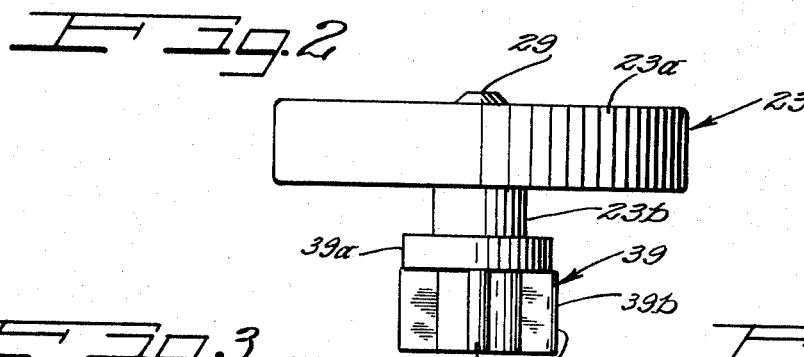
FIG. 2 is a side elevational plan view of a poppet valve insert structure for the diaphragm, in somewhat enlarged scale, illustrating certain principles of the invention.
Figure 3:
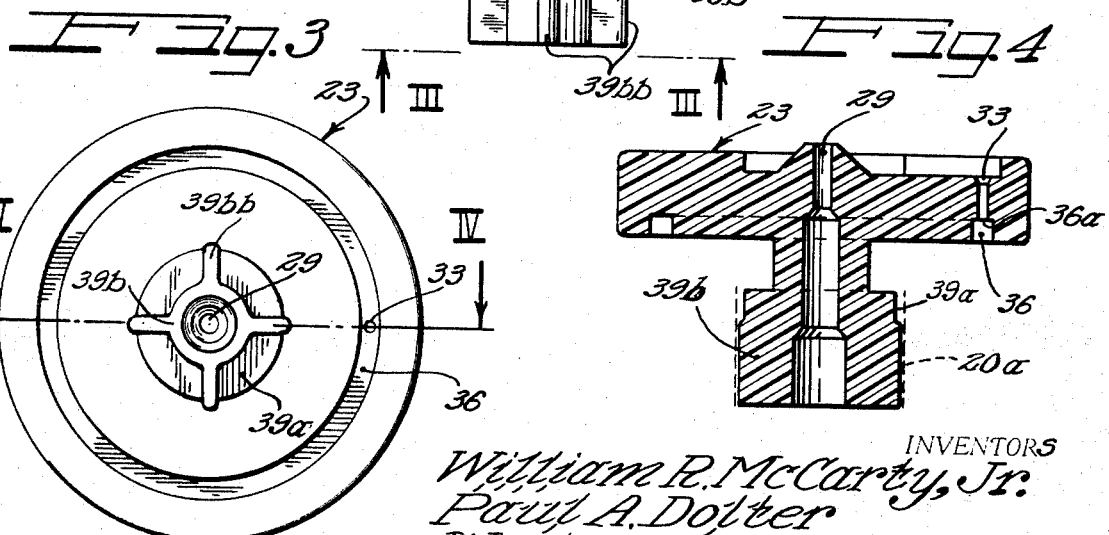
FIG. 3 is a bottom plan view taken substantially along lines III—III of the insert structure shown at FIG. 2.
Figure 4:
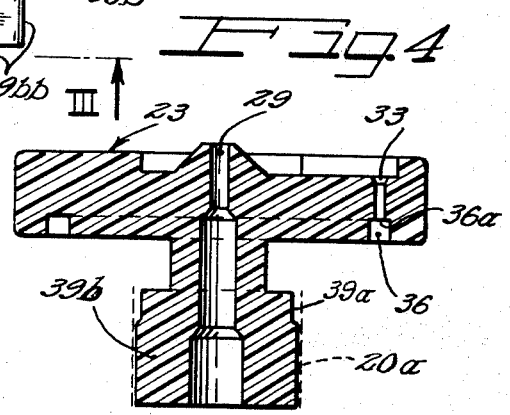
FIG. 4 is a transverse sectional view taken substantially along lines IV—IV of the insert structure shown at FIG. 3, showing its working relation with an outlet.

Referring now to FIGS. 2, 3 and 4, it will be noted that the poppet valve insert structure 23 is composed of an upper valve head portion 23a which actually engages and cooperates with the central portion of a diaphragm 15 to provide rigidity and support thereto. The poppet valve structure 23 also comprises a main portion 23b (i.e., stem element 39) having a neck portion 39a and a base or body portion 39b. The poppet valve structure 23 has a centrally located pilot orifice 29 leading from upper head portion 23a through the main portion 23b to provide a passageway throughout the poppet valve insert structure. The stem or main portion 23b is of considerably smaller diameter than the head portion 23a or the neck and base portions 39a and 39b respectively. The valve head portion 23a is, of course, of a diameter sufficient to at least comply cover or block outlet bore 20. The neck portion 39a is of a somewhat larger diameter than the main portion 23b but is smaller than the diameter of the outlet bore 20. In other words there is no line contact between the neck portion 39a and the peripheral walls 20a of the outlet bore 20. This relation is best seen, in phantom, at FIG. 4. The arrangement allows the clearance between the stem element 39 and the outlet bore so as to throttle fluid flow into the outlet. This clearance also allows dirt and like foreign material to flow past the stem element 39 without hindering the throttling effect. The neck portion 39a is a solid and has a precalculated height, i.e., the distance between main portion 23b and base portion 39b. Throttling or metering of fluid flow at low flow rates is controlled at least to a certain extent by the amount of the height dimensions that enters the outlet bore during closing. As more of the neck portion height enters the bore, the finer the throttling or metering effects are noted. Of course, such fine throttling of fluid flow eliminates or reduces (i.e., substantially eliminates) water hammer effects. This throttling or metering effect by the neck portion 39a can be enhanced by knurling or otherwise roughening up the side surfaces thereof. Such rough side surfaces further reduce the flow rate by decreasing the valve orifice coefficient in accordance with the formula $F=CdA$ (pressure drop)$^{1/2}$ wherein $F$=flow, $A$=area and $Cd$=coefficient of discharge and velocity. However, rough flow surfaces function in this manner only if they are of sufficient extent. i.e. the neck portion 39a must be of a predetermined height. A neck portion 39a of such a predetermined height and having such rough side (flow) surfaces, lowers the flow rate without a reduction in clearance between the outlet walls and the neck portion of stem element 39.

The base portion 39b is also of a diameter larger than the main portion 23b and is substantially identical with the inner diameter of outlet bore 20. In this manner the base portion is in "sliding" or close-clearing engagement with the inner periphery of the outlet bore so as to achieve positive guidance of the valve structure without allowing any misalignment. As shown in the drawings, a plurality of radially extending ribs 39bb are provided in spaced relation about the circumference of the stem portion 23b. As will be appreciated, any number of ribs 39bb may be utilized, however they should be evenly spaced from one another and are preferably four in number. The area between the ribs is spaced inwardly from the periphery of the ribs and defines high rate flow areas. As indicated the ribs 39bb are arranged so as to have a combined dimension (i.e., the length of one rib, plus the diameter of the main body plus the diameter of another oppositely disposed rib) that is substantially equal to the inside diameter of an outlet bore. This type of arrangement allows a sliding engagement with the outlet bore and prevents any misalignment of the poppet valve during its operation while allowing rapid fluid flow past the stem element through the flow areas thereof and into the outlet when the poppet valve structure 23 is moved to its open position.

The poppet valve insert structure 23 has a full diameter at its upper head portion 23a and a gradually reduced or varying diameter at its neck and base portions and is provided with a plurality of guiding ribs 39bb that slidingly engage the outlet bore and maintain contact with the inner peripheral walls 20a of such bore outlet at the full open position of the poppet valve structure 23. In this manner water hammer effects are substantially eliminated and there is no misalignment of the armature, diaphragm or seating relation upon closing. The use of a plastic material in constructing the poppet valve structure reduces any long-term changes in dimensions associated with rubber throughout the life of the valve assembly.

Referring now briefly to the manner of operation of the valve assembly and beginning with the valve at its off position, such as shown in FIG. 1, it will be seen that the fluid flow from inlet 11 to pressure chamber 32 is provided via a passage through the diaphragm orifice 35 and through the bleed hole orifice 33 (which are in series) of the poppet structure so as to equalize the fluid pressure along opposite sides of the diaphragm and poppet valve structure. When the solenoid 31 is energized and the armature 26 is caused to move upwardly so as to move pilot valve 27 from engagement with the pilot orifice 29, fluid within the chamber 32 will flow through the central pilot orifice 29 downwardly and into the outlet bore 20 and thereby relieve some of the pressure within the chamber 32 while the pressure on the opposed side of the diaphragm is maintained relatively constant. In this manner the constant pressure becomes greater than the pressure within the chamber 32 and causes a lifting of the diaphragm so as to unseat it from the outlet bore 20 and thereby open the valve 15 for full flow. As indicated hereinbefore, the stem element 39 of the poppet valve 23 has means 39b maintaining contact with the peripheral walls of the outlet bore 20 to provide positive guidance of the diaphragm 15 and poppet valve structure 23 during subsequent closing while allowing high flow rates thereby at the open position. During the closing operation, the solenoid 31 is de-energized and the spring 30 (or some other force means) forces the armature 26 downwardly so that the pilot valve 27 recontacts the pilot orifice 29 and shuts off fluid flow and allows the pressure within the chamber 32 to rebuild and gradually force the diaphragm 15 and poppet valve 23 back down against the outlet bore 20 to seal the outlet. During this closing operation, the poppet valve insert 23 is gradually forced downward and the base portion 39b thereof first enters the outlet bore and then the neck portion 39a enters the bore. As these portions 39b and 39a enter the bore, they throttle the fluid flow from a high rate to a low rate and thereby eliminate detrimental water hammer effects.

It should be understood that the screening holes 35 are of a sufficient diameter that the valve will operate with only one unclogged screening hole in the diaphragm and that the only way large pieces of dirt or the like can cause a problem is by simultaneously clogging all of the screen holes. As disclosed in our co-pending application, a screen means 36a may be integrally formed within the groove 36 (as shown at FIG. 4) and provide a filtering barrier between the groove 36 and the bleed hole 33 thereby preventing any dirt from clogging the bleed hole. Of course, if desired the screen may also be integrally formed into the diaphragm orifice 35. Further, the main flow of fluid through the valve actually flushes and cleanses the screening holes 35 each time the valve is opened so that dirt does not accumulate at any one location.

As indicated hereinbefore, the bleed hole 33 and the diaphragm orifice 35 are in series communication and have different sized openings or cross sectional flow areas. The series arrangement of the holes and orifices and their respective flow areas affects water hammer phenomena and thus provides another means of controlling such phenomena. For example, when the size (diameter) of the orifice 35 is reduced 50 percent and the size of the bleed hole is unchanged, water hammer effects are reduced by about 33 percent. In this manner not only are water hammer effects reduced but dirt particles or the like are also blocked from entering the pressure outlet chamber and interfering with proper operation of the valve structure. Additionally, the number of orifices in the diaphragm affect water hammer. Smaller numbers of orifices allow lesser water hammer effects, when all other conditions are equal.

With the structure just described, improved metering or throttling is provided than has heretofore been practical, giving the valve a slower close-off rate and thereby reducing water hammer and premature failure of the plumbing caused by high water pressure shock. Further, the structure allows the use of smaller central pilot and bleed orifices and thereby reduces the forces required to operate the valve with the resultant reduction in the cost of the valve. The screening of the dirt from the pressure chamber before it reaches the armature guide and pilot valve also reduces wear of the guide by the reciprocating armature and reduces wear of the innerface of the plastic and the diaphragm convolutions and prevents dirt particles from becoming embedded in the pilot valve to thereby further reduce failure in the closing of the valve. Further, the screen reduces erosion caused by the entrained dirt in the fluid through the bleed orifice and through the central pilot orifice.

In addition, the arrangement of the poppet valve structure stem element so as to have a varying diameter gradually approaching that of the outlet bore provides improved metering and throttling of fluid flow that is not effected by dirt particles. Further, by providing a stem element of a length equal to at least the distance between the open and closed position and extending into the outlet ensures positive guidance of the moving part and prevents any misalignment during closing operation while allowing high fluid flow about said stem element during the open position. Yet further by arranging the diaphragm bleed holes and poppet valve screened holes in series communication further elimination of water hammer is provided and the number of such holes can be varied for additional control.

We claim as our invention:

1. In a solenoid controlled pressure operated diaphragm shut-off valve,
    a valve body having a valve cavity therein,
    an inlet passageway opening to said cavity and having communication with a source of fluid under pressure,
    an outlet port,
    an annular valve seat disposed radially inwardly of said inlet passageway and having communications with said outlet port,
    an annular sealing groove extending about said outlet port,
    a flexible diaphragm movable between open and closed positions for cooperating with said annular valve seat to control the flow of fluid between said inlet passageway and said outlet port and sealed along its margin in said sealing groove,
    said diaphragm having a thin-walled bellows-like annular portion disposed inwardly of its peripheral portion and a disk-like central portion,
    said diaphragm defining a fluid pressure chamber between said inlet passageway and said outlet port,
    a relatively rigid poppet valve insert structure backing up said disk-like central portion and having a disk-like portion reinforcing said diaphragm on one side thereof and a central stem body portion extending from said insert structure disk-like portion through said diaphragm beneath said disk-like central portion of said diaphragm and having guiding engagement with said outlet port,
    said central body stem portion having an intermediate portion of a diameter less than said outlet port for throttling fluid flow from said inlet passageway to said outlet port and a base portion of a length at least sufficient to maintain contact with the periphery of said outlet port as said diaphragm moves between the open and closed positions,
    said base portion having a plurality of ribs radially spaced about its peripheral surface for sliding engagement with said outlet port,
    a central pilot orifice leading through said central body stem portion of said insert structure and said disk-like portion of said diaphragm to provide communication with said outlet port,
    a bleed means radially spaced from said pilot orifice providing constant fluid communication between said inlet passageway and said fluid pressure chamber,
    said bleed means comprising a plurality of circumferentially spaced screening holes leading through said diaphragm, a single bleed hole leading through said insert having a smaller cross sectional flow area than the cross sectional flow area of said central pilot orifice, and passageway means between said circumferentially spaced screening holes and said single bleed hole leading through said insert structure,
    an armature having a valve at one end thereof cooperating with said central pilot orifice to open and close said pilot orifice, and
    a solenoid coil energizable to move said armature for opening and closing said pilot orifice and for maintaining closed said orifice upon contact of said orifice by said valve.

2. In a solenoid controlled pressure operating diaphragm shut-off valve as defined in claim 1 wherein the plurality of screening holes leading through the diaphragm are each in series communication with the single bleed hole.

3. In a solenoid controlled pressure operating diaphragm shut-off valve as defined in claim 2 wherein the cross sectional flow area of each of said plurality of screening holes is different from the cross-sectional flow area of the single bleed hole.

4. In a pilot controlled pressure operated diaphragm valve,
    a valve body having a valve cavity therein,
    an inlet passageway opening to said cavity and having communication with a source of fluid under pressure,
    an outlet port, an annular valve seat disposed radially inwardly of said inlet passageway and having communication with said outlet port, an annular sealing groove extending about said outlet port, a relatively flexible diaphragm composed of a rubber-like material, said diaphragm being sealed along its margins in said sealing groove and being movable between open and closed positions for cooperating with said annular valve seat to control fluid flow between said inlet passageway and said outlet port, said diaphragm defining a fluid pressure chamber between said inlet passageway and said outlet port, said diaphragm having a thin-walled bellows-like annular portion disposed inwardly of its margins and a disk-like center portion, said center portion having a central opening communicating with said outlet port, a relatively rigid throttling grommet composed of a plastic material inserted into said central opening of the diaphragm and having a disk-like portion reinforcing said diaphragm on one side thereof and a central stem body portion extending from said grommet disk-like portion through said diaphragm beneath said disk-like portion of said diaphragm, said central stem body portion having guiding engagement with said outlet port, said central body portion having an intermediate portion of a diameter less than said outlet port for throttling fluid flow at relatively low flow rates from said inlet passageway to said outlet port and a base portion of a length at least sufficient to maintain control with the periphery of said outlet port as said diaphragm moves between the open and closed positions, said base portion having a plurality of ribs radially spaced about its peripheral surface for sliding engagement with said outlet port and for throttling fluid flow at relatively high flow rates from said inlet passageway to said outlet port, a central pilot orifice leading through said central body stem portion and said disk-like portion of said grommet to provide communication between said inlet passageway and said outlet port through said diaphragm, a bleed means radially spaced from said pilot orifice providing constant fluid communication between said inlet passageway and said fluid pressure chamber, and means for selectively opening and closing said central pilot orifice.

5. In a pilot controlled pressure operated diaphragm valve as defined in claim 4 wherein the central stem body portion of said grommet has roughened side surfaces for reduction of flow rates.

6. In a pilot controlled pressure operated diaphragm valve as defined in claim 4 wherein the intermediate portion of said central stem body portion has a gradually decreasing diameter from the disk-like portion of said grommet to said base portion thereof.

7. In a pilot controlled pressure operated diaphragm valve as defined in claim 4 wherein the bleed means comprises a plurality of circumferentially spaced screening holes leading through said diaphragm, a single bleed hole leading through said insert having a smaller cross sectional flow area than the cross sectional flow area of said central pilot orifice, and passageway means between said circumferentially spaced screen holes and said single bleed hole leading through said insert structure.

* * * * *